United States Patent
Blaski et al.

(10) Patent No.: US 10,239,285 B2
(45) Date of Patent: Mar. 26, 2019

(54) SPINNING JOINING OF SIMILAR AND DISSIMILAR MATERIALS

(71) Applicant: GM Global Technology Operations LLC, Detroit, MI (US)

(72) Inventors: Bradley J. Blaski, Sterling Heights, MI (US); Steven Cipriano, Chesterfield Township, MI (US); Richard C. Janis, Grosse Pointe Woods, MI (US); Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/377,376

(22) Filed: Dec. 13, 2016

(65) Prior Publication Data
US 2018/0162097 A1    Jun. 14, 2018

(51) Int. Cl.
*B29C 65/06* (2006.01)
*B32B 7/08* (2006.01)
(Continued)

(52) U.S. Cl.
CPC ............... *B32B 7/08* (2013.01); *B21J 15/027* (2013.01); *B32B 3/266* (2013.01); *B32B 7/12* (2013.01);
(Continued)

(58) Field of Classification Search
CPC ... B29C 65/48; B29C 65/483; B29C 65/4835; B29C 65/02; B29C 65/06; B29C 65/0627; B29C 65/0672; B29C 65/0681; B29C 65/069; B29C 65/34; B29C 65/56; B29C 65/562; B29C 65/565; B29C 65/601; B29C 65/72; B29C 66/003; B29C 66/304; B29C 66/348; B29C 66/43; B29C 66/45; B29L 2031/727; B29L 2031/7288; B21J 15/027; B32B 2038/0096; B32B 37/04; B32B 37/1207; B32B 37/1253; B32B 7/08; B32B 2037/1207; B32B 2037/1253
USPC .... 156/60, 73.5, 91, 92, 196, 221, 222, 290, 156/293, 303.1, 307.1, 307.7, 308.2, 156/308.4, 309.6; 264/68; 228/112.1, 228/114.5
See application file for complete search history.

(56) References Cited

U.S. PATENT DOCUMENTS

| | | | | |
|---|---|---|---|---|
| 5,361,478 A | * | 11/1994 | Grossberndt | B21J 5/066 29/432 |
| 2008/0149256 A1 | * | 6/2008 | Wang | B21J 15/025 156/92 |

(Continued)

FOREIGN PATENT DOCUMENTS

| | | | | |
|---|---|---|---|---|
| DE | 19620814 A1 | * | 11/1997 | B23K 20/127 |
| DE | 10348427 A1 | * | 5/2005 | B21J 5/066 |

(Continued)

*Primary Examiner* — Philip C Tucker
*Assistant Examiner* — Brian R Slawski

(57) ABSTRACT

A spin fastening system includes a first member and an adhesive layer applied to the first member. A second member is positioned in contact with the adhesive layer. At least a portion of the adhesive layer is cured after the second member is positioned in contact with the adhesive layer to render at least the portion of the adhesive layer substantially rigid. At least one spin fastener is inserted successively through each of the second member, the cured portion of the adhesive layer, and the first member.

15 Claims, 3 Drawing Sheets

(51) Int. Cl.

| | | |
|---|---|---|
| *B29C 65/00* | (2006.01) | |
| *B32B 37/00* | (2006.01) | |
| *C08J 5/00* | (2006.01) | |
| *B29C 35/00* | (2006.01) | |
| *B29C 35/02* | (2006.01) | |
| *B32B 3/26* | (2006.01) | |
| *B32B 7/12* | (2006.01) | |
| *B32B 15/04* | (2006.01) | |
| *B32B 15/18* | (2006.01) | |
| *B32B 15/20* | (2006.01) | |
| *B32B 38/00* | (2006.01) | |
| *B21J 15/02* | (2006.01) | |
| *B29C 65/48* | (2006.01) | |
| *B29C 65/56* | (2006.01) | |
| *B29C 65/72* | (2006.01) | |
| *B32B 37/12* | (2006.01) | |

(52) U.S. Cl.
CPC ............ *B32B 15/043* (2013.01); *B32B 15/18* (2013.01); *B32B 15/20* (2013.01); *B32B 38/0012* (2013.01); *B29C 65/069* (2013.01); *B29C 65/0627* (2013.01); *B29C 65/483* (2013.01); *B29C 65/562* (2013.01); *B29C 65/72* (2013.01); *B29C 66/003* (2013.01); *B29C 66/348* (2013.01); *B29C 66/43* (2013.01); *B29C 66/45* (2013.01); *B32B 2037/1253* (2013.01); *B32B 2038/0096* (2013.01); *B32B 2250/02* (2013.01); *B32B 2255/06* (2013.01); *B32B 2305/72* (2013.01); *B32B 2311/24* (2013.01); *B32B 2311/30* (2013.01)

(56) References Cited

U.S. PATENT DOCUMENTS

| | | | |
|---|---|---|---|
| 2009/0202294 A1* | 8/2009 | Apfel ........................ | F16B 5/02 |
| | | | 403/267 |
| 2015/0174714 A1* | 6/2015 | Somnitz .............. | B29C 66/7212 |
| | | | 29/525.11 |
| 2015/0328677 A1* | 11/2015 | Pfeiffer ................ | B21K 25/005 |
| | | | 29/505 |

FOREIGN PATENT DOCUMENTS

| | | | | |
|---|---|---|---|---|
| DE | 102010025387 A1 * | 12/2011 | ............ | B21J 15/025 |
| WO | WO-2013020658 A1 * | 2/2013 | ......... | B23K 11/0066 |

\* cited by examiner

SPINNING JOINING OF SIMILAR AND DISSIMILAR MATERIALS

INTRODUCTION

The present disclosure relates to material joining using high speed friction fasteners.

Materials such as steel, aluminum, and composites can be joined to each other or to one of the others by the use of high speed or spin fasteners which generate frictional heat, locally softening or melting the materials and providing a flow of the materials as the fastener passes through. Spin fasteners are also beneficial when access is only available to one side of a panel or component.

Spin fasteners function by locally heating the materials to be joined using friction from a high speed of rotation and insertion pressure which locally softens, melts or pools the materials to be joined. A portion of the softened material or melt normally flows up and under the head of the spin fastener, while most of the softened material or melt flows out an exit area to create additional material engaged by threads of the spin fastener. It has been found however, that as a thickness of the material increases, and particularly as a thickness of the outer material increases, a portion of the material flow is forced into and trapped between the material panels or components as the spin fastener exits the outer material. This problem is exacerbated when the panel members cannot be easily clamped together at locations where it is desirable to install spin fasteners. The trapped material cools down or solidifies and creates a standoff distance or gap between the two components, and weakens the resultant joint due to creation of stress concentrations created at the spin fastener material interfaces.

Thus, while current spin fastener joints achieve their intended purpose, there is a need for a new and improved system and method for joining materials using spin fasteners.

SUMMARY

According to several aspects, a spin fastening system includes a first member. An adhesive layer is applied to the first member. A second member is positioned in contact with the adhesive layer. At least a portion of the adhesive layer is cured after the second member is positioned in contact with the adhesive layer to render at least the portion of the adhesive layer substantially rigid. At least one spin fastener is inserted successively through each of the second member, the cured portion of the adhesive layer, and the first member.

In an additional aspect of the present disclosure, the spin fastener includes a penetration end, the penetration end when brought into direct contact with an outward facing surface of the second member generating heat and pressure causing a portion of the material of the second member to liquefy or plasticize.

In another aspect of the present disclosure, a first outward flow portion of a liquefied or plasticized material of the adhesive layer and of the first member congregates between the outward facing surface of the second member and a head of the spin fastener.

In another aspect of the present disclosure, a plurality of spheres is embedded into the adhesive layer which act as a shim or spacer.

In another aspect of the present disclosure, each of the spheres has a common diameter substantially equal to a desired value of a thickness of the adhesive layer.

In another aspect of the present disclosure, each of the spheres define a polymeric material.

In another aspect of the present disclosure, each of the spheres define a glass material.

In another aspect of the present disclosure, when the second member is positioned in contact with the adhesive layer the spheres directly contact a surface of the first member and an oppositely directed surface of the second member.

In another aspect of the present disclosure, the spheres are substantially incompressible by a force exerted on the adhesive layer during installation of the at least one spin fastener such that contact of the second member with the adhesive layer does not compress the adhesive layer below a desired thickness of the adhesive layer.

In another aspect of the present disclosure, when a material of the spheres cannot be liquefied by a temperature generated during insertion of the at least one spin fastener, the spheres are selectively inserted into the adhesive layer outside of a predefined width of the cured portion to avoid contact by the at least one spin fastener with the spheres.

In another aspect of the present disclosure, the adhesive layer is applied in a substantially viscous liquid form to a surface of the first member prior to positioning of the second member.

In another aspect of the present disclosure, a width and a position of the cured portion are predetermined to suit a desired installation location of one of the at least one spin fasteners.

In another aspect of the present disclosure, an optimum adhesive layer thickness for a specific material of the first member and the second member selected from a plurality of adhesive layer thicknesses.

In another aspect of the present disclosure, a thickness of the adhesive layer after curing and prior to installation of the spin fastener is substantially fixed and is not substantially compressible during insertion of the spin fastener.

According to several aspects, a method for spin fastening components includes: applying an adhesive layer to a first member; positioning a second member in contact with the adhesive layer; curing at least a portion of the adhesive layer after the second member is positioned in contact with the adhesive layer to render at least the portion of the adhesive layer substantially rigid; and inserting at least one spin fastener successively through each of the second member, the cured portion of the adhesive layer, and the first member to mechanically join the first member, the adhesive layer and the second member.

In another aspect of the present disclosure, the method further includes rotating the spin fastener such that when a penetration end of the spin fastener is brought into direct contact with an outward facing surface of the second member, heat and pressure generated by the penetration end at the outward facing surface causes a portion of the material of the second member to liquefy.

In another aspect of the present disclosure, the method further includes forcing a first outward flow portion of a liquefied material of the adhesive layer and of the first member to congregate between the outward facing surface of the second member and a head of the spin fastener; and pushing a second outward flow portion of a liquefied material of the cured portion of the adhesive layer and of the first member outward from the first member to pool in contact with an outward facing surface of the first member, the cured adhesive preventing any of the first outward flow portion or the second outward flow portion from remaining proximate to the adhesive layer.

In another aspect of the present disclosure, the method further includes embedding a plurality of spheres into the adhesive layer, each of the spheres having a common diameter substantially equal to a desired thickness of the adhesive layer.

In another aspect of the present disclosure, the curing step for the at least a portion of the adhesive layer includes entirely curing the adhesive layer after the second member is positioned in contact with the adhesive layer.

According to several aspects, a method for spin fastening components includes: applying an adhesive layer to a first member; positioning a second member in contact with the adhesive layer; curing the adhesive layer after the second member is positioned in contact with the adhesive layer to render the adhesive layer substantially rigid; and inserting at least one spin fastener successively through each of the second member, the cured adhesive layer, and the first member to mechanically join the first member, the adhesive layer and the second member, the spin fastener forcing a liquefied portion of the second member to accumulate proximate to a head of the spin fastener and forcing a liquefied second portion containing material of the adhesive layer and the first member to accumulate proximate to an exposed portion of a shank of the spin fastener, the cured adhesive preventing any of the liquefied first portion or the liquefied second portion from remaining proximate to the adhesive layer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
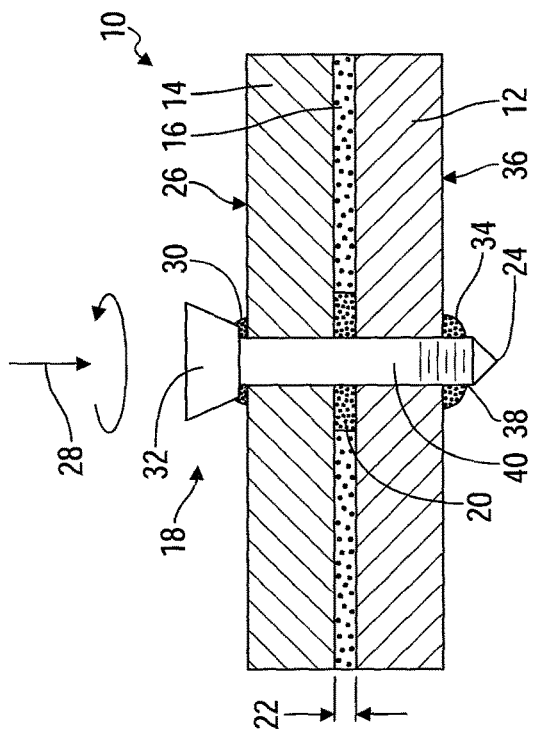
FIG. 1 is a cross sectional front elevational view of a spin fastening system according to an exemplary aspect.

Referring to FIG. 1, a spin fastening system 10 includes a first member 12 with a second member 14 connected to the first member 12 using an adhesive layer 16 positioned directly between the first member 12 and the second member 14. The adhesive is cured after the second member 14 and the first member 12 are connected to the adhesive layer 16 and before installation of a spin fastener 18. The spin fastener 18 is then inserted successively through each of the second member 14, the adhesive layer 16 and the first member 12. If the entire adhesive layer 16 is not cured, prior to insertion of the spin fastener 18 at least a portion 20 of the adhesive layer 16 is cured such that a thickness 22 of the adhesive layer 16 is substantially fixed and is not substantially compressible during insertion of the spin fastener 18.

The spin fastener 18 is rotated at high rotational speed (approximately 1000 to 8000 rpm) such that when a penetration end 24 of the spin fastener 18 is brought into direct contact with an outward facing surface 26 of the second member 14 in a downward direction 28, heat and pressure generated by the penetration end 24 at the outward facing surface 26 cause a portion of the material of the second member 14 to liquefy. As the spin fastener 18 continues to move in the downward direction 28, material of adhesive layer 16 discomposes at least at the portion 20, and then the material of the first member 12 contacted by the spin fastener 18 liquifies to combine with the liquified portion of the material of the second member 14. As used herein, the "spin fastener" or spin fasteners can include, but are not limited to fasteners that generate heat from frictional motion which partially melt or liquefy the materials being contacted, and include flow drilled screws, pop rivets, blind rivets, and self-piercing rivets.

Initially, a first outward flow portion 30 of liquefied material from the second member 14 and the adhesive layer 16 rises upward and congregates between the outward facing surface 26 and a head 32 of the spin fastener 18. According to several aspects, the head 32 of the spin fastener 18 is concave shaped to receive the first outward flow portion 30, allowing an outer perimeter of the head 32 to directly contact the outward facing surface 26 of the second member 14.

Subsequently, as the spin fastener 18 moves through the first member 12, a second outward flow portion 34 of liquefied material of the cured portion 20 of the adhesive layer 16 and from the first member 12 is forced or pushed downward (as viewed in FIG. 1) and outward from the first member 12 and pools in contact with an outward directed surface 36 of the first member 12. The second outward flow portion 34 is then available to directly contact a screw thread 38 created on a shank 40 of the spin fastener 18 and therefore provides additional threaded engagement for the screw thread 38. Because all of the adhesive layer 16 or at least the portion 20 of the adhesive layer 16 receiving the spin fastener 18 is cured prior to installation of the spin fastener 18, and is therefore substantially rigid, material of the adhesive layer 16, for example at the portion 20, partially discomposes such that material of the first member 12 and the second member 14 contribute material to the second outward flow portion 34. The substantially rigid condition of the adhesive layer 16 precludes retention of liquefied material in the area of the adhesive layer 16 as the spin fastener 18 passes through the adhesive layer 16.

The spin fastening system 10 of the present disclosure prevents retention of material in the region of the adhesive layer 16. The cured adhesive preventing any of the liquefied first portion or the liquefied second portion from remaining proximate to the adhesive layer. Retention of material in the region of the adhesive layer 16 is undesirable because it increases the thickness 22 of the adhesive layer 16 and can create pockets between the first member 12 and the second member 14 as liquefied material subsequently solidifies between the first member 12 and the second member 14. Such pockets or solidified material can detrimentally impact the strength of the connection between the first member 12 and the second member 14. By bonding the first member 12 to the second member 14 with a cured and substantially incompressible adhesive layer 16 that retains the bonded connection but partially discomposes during spin fastener 18 installation, the liquefied portions of the first member 12 and the second member 14 continue to displace as part of the second outward flow portion 34 thereby preventing the liquefied or discomposed portions of any of the first member 12, the adhesive layer 16, or the second member 14 from being trapped in the region of the adhesive layer 16.

Figure 2:
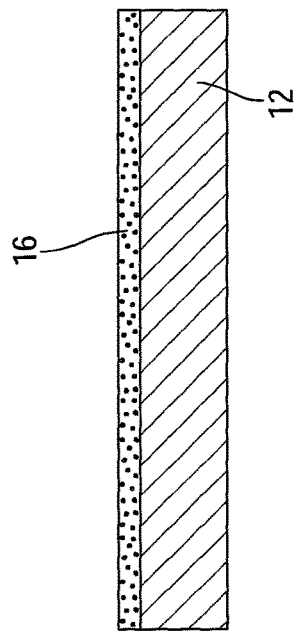
FIG. 2 is a side elevational view of the first member and the adhesive layer of the spin fastening system of FIG. 1.

Referring to FIGS. 2 through 6 and again to FIG. 1, the steps of a method for using the spin fastening system 10 are provided. Referring more specifically to FIG. 2, the adhesive layer 16 is initially applied to the first member 12. The first member 12 can be any of a multitude of materials including a metal such as steel or aluminum, a polymeric material, or a composite material such as a carbon fiber polyamide composite. The adhesive layer 16 can be applied as a sheet or as a liquid, by spreading, by spraying, or by any suitable installation process. One example of a suitable adhesive material for the adhesive layer 16 is Dow 1480 adhesive, manufactured by the Dow Chemical Company of Midland, Mich., U.S.A.

Referring to FIG. 3, and again to FIG. 2, after application of the adhesive layer 16, the second member 14 is brought into contact with the adhesive layer 16. Similar to the first member 12, the second member 14 can be any of a multitude of materials including a metal such as steel or aluminum, a polymeric material, or a material such as a carbon fiber polyamide composite. The material of the first member 12 and the second member 14 can be the same material, or can be different from each other.

Figure 3:
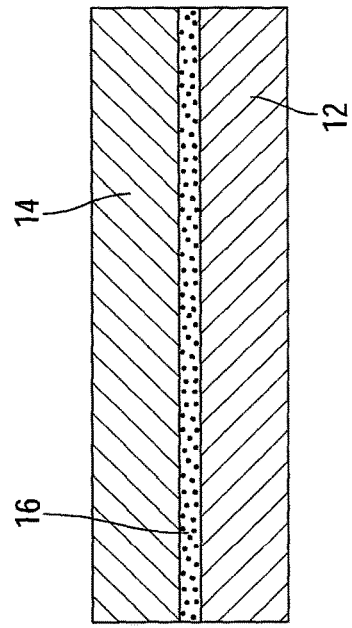
FIG. 3 is a side elevational view modified from FIG. 2 to further add the second member.

Referring to FIG. 4 and again to FIG. 3, after installation of the second member 14 onto the adhesive layer 16, either the entire adhesive layer 16, or only the portion 20 of the adhesive layer 16 where each subsequent installation of a spin fastener 18 will be installed is cured. The curing operation can be conducted in any known way, including by ultraviolet (UV) light, heat, induction heating oven, a hardening agent, or the like. If only the cured portion 20 of the adhesive layer 16 is to be cured, a width 42 and the position of the cured portion 20 are predetermined to suit a desired installation location of each one of the spin fasteners 18. According to further aspects, it is anticipated that multiple spin fasteners 18 will be used to join the first member 12 to the second member 14, therefore multiple cured portions 20 can be created as noted above and located at predetermined locations to suit subsequent installation of the spin fasteners 18. If the entire adhesive layer 16 is cured after installation of the second member 14, multiple spin fasteners 18 can be installed at any desired locations. According to further aspects, for thick workpieces, after several spin fasteners 18 are installed, the dimensions of the desired structure are fixed, consequently the need to cure the adhesive layer 16 at every location of a spin fastener 18 is obviated. For thin workpieces, the adhesive layer 16 can be cured at every location of a spin fastener 18.

Figure 4:
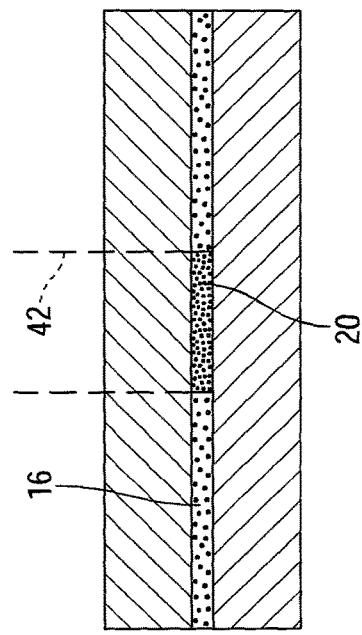
FIG. 4 is a side elevational view modified from FIG. 3 to further add a cured portion of the adhesive layer.

Referring to FIG. 5 and again to FIG. 4, an exemplary one of the spin fasteners 18 is positioned at a substantially centered location of one of the cured portions 20 and axially rotated in a rotational direction 44. The centered locations of the cured portions 20 can be pre-marked or otherwise dimensionally located on the outward facing surface 26 of the second member 14, for example by programming the locations into a computer memory of a computer numeric control (CNC) machine or a robot.

Figure 5:
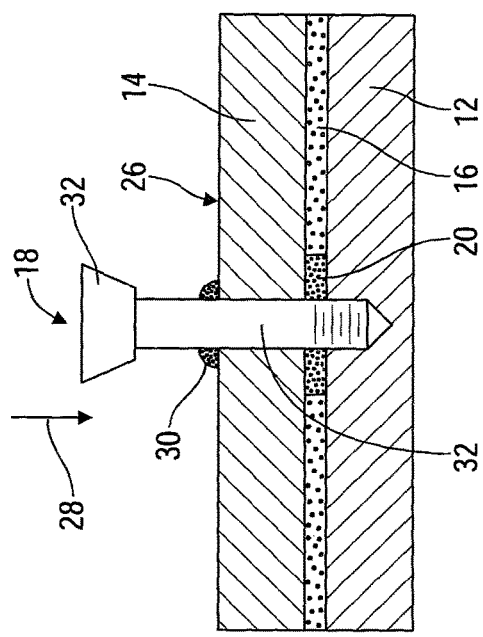
FIG. 5 is a side elevational view similar to FIG. 4 showing a spin fastener aligned prior to installation.

Referring to FIG. 6 and again to FIG. 5, the spin fastener 18 is shown as it is rotated at high speed and forced in the direction 28 through each of the second member 14 and the cured portion 20 of the adhesive layer 16, and is shown entering the first member 12. During this time, the first outward flow portion 30 of liquefied material rises upward and congregates between the outward facing surface 26 and the head 32 of the spin fastener 18.

Referring to FIG. 7 and again to FIG. 1, according to several aspects the adhesive layer 16 is applied to a surface 46 of the first member 12. To pre-define the thickness 22 of the adhesive layer 16 a plurality of spheres 48 made for example from a material such as a polymeric material or glass are embedded into the material of the adhesive layer 16, for example prior to application of the adhesive layer 16. Each of the spheres 48 has a common diameter substantially equal to a desired value of the thickness 22.

Figure 7:
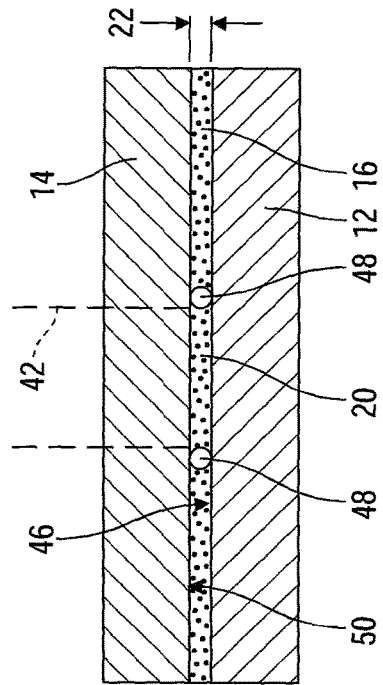
FIG. 7 is a side elevational view of the first member and the adhesive layer of the spin fastening system of FIG. 1 further showing multiple spheres positioned within the adhesive layer.
Figure 6:
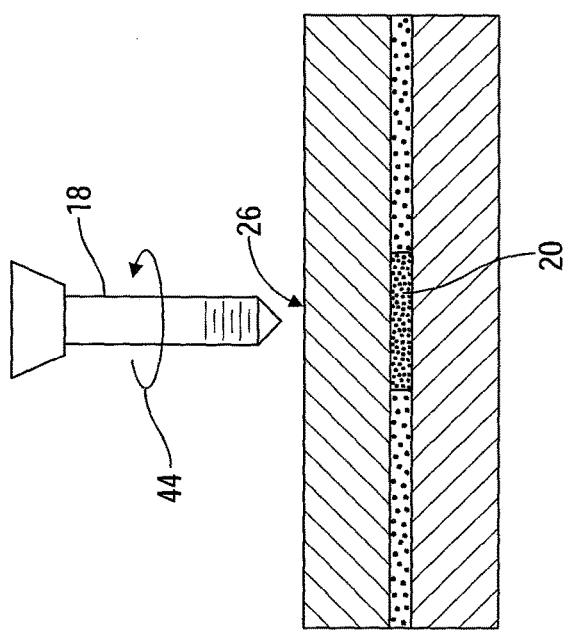
FIG. 6 is a side elevational view similar to FIG. 5 showing the spin fastener in a partially installed position.
Figure 8:
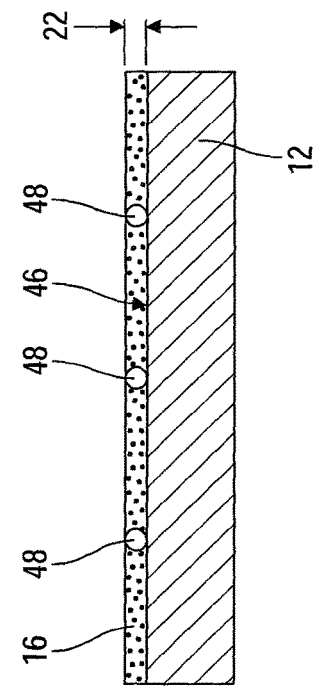
FIG. 8 is a side elevational view similar to FIG. 7 further showing the second member connected to the adhesive layer.

Referring to FIG. 8 and again to FIGS. 1, 4 and 7, the second member 14 is positioned in contact with the adhesive layer 16 such that the spheres 48 directly contact the surface 46 of the first member 12 and an oppositely directed surface 50 of the second member 14. The spheres 48 are substantially incompressible by a force exerted on the adhesive layer 16 during installation of the spin fasteners 18 such that subsequent contact of the second member 14 with the adhesive layer 16 does not compress the adhesive layer 16 below the desired thickness 22. When a material selected for the spheres 48 cannot be liquefied by the temperature generated during subsequent insertion of the spin fastener 18, the spheres 48 can be selectively inserted into the adhesive layer 16 outside of the predefined width 42 of the cured portion 20 to avoid contact between the spin fastener 18 and any of the spheres 48. The spheres 48 are retained in the adhesive layer 16 after curing.

Figure 9:
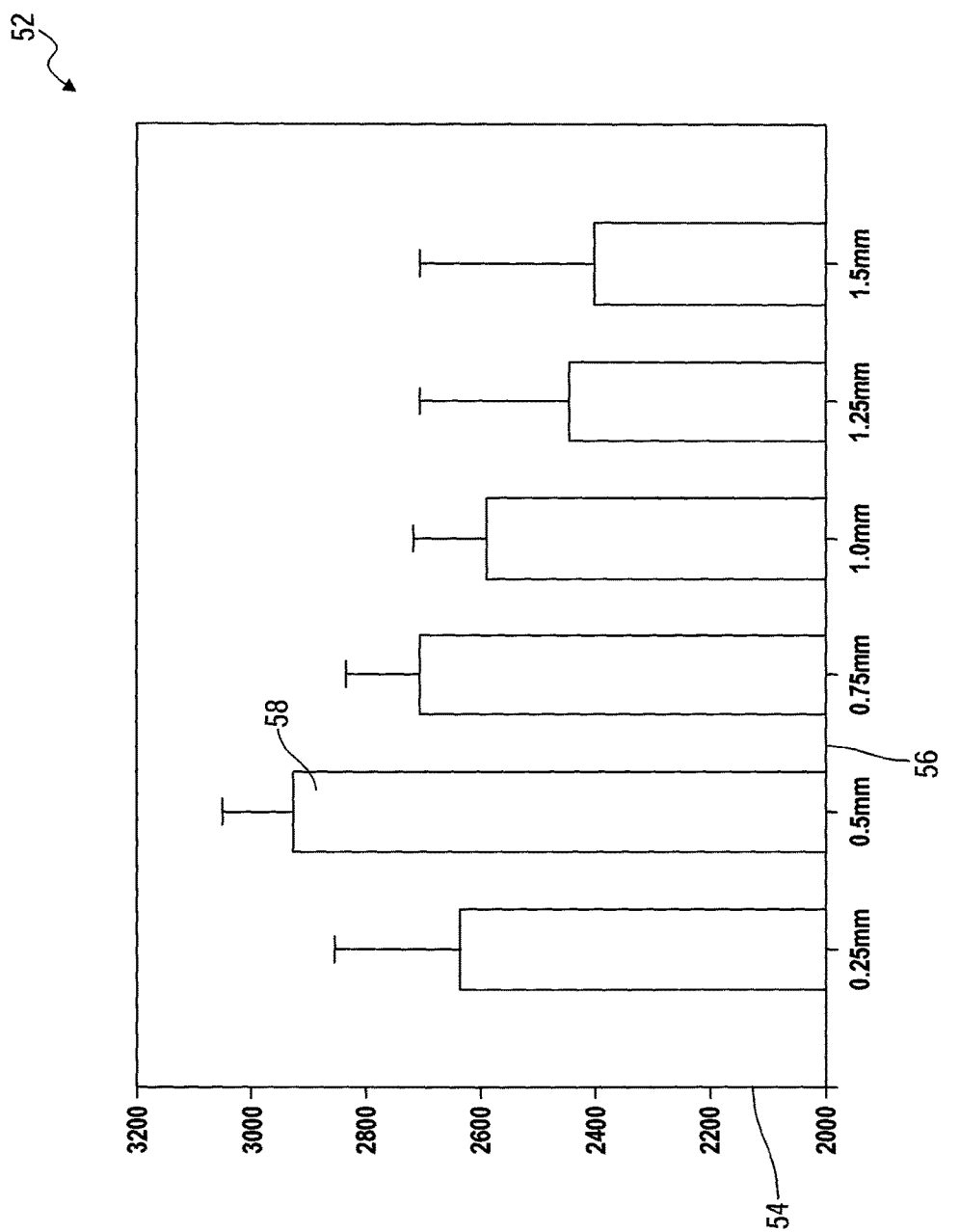
FIG. 9 is a graph presenting joint strengths obtained for various thicknesses of the adhesive layer.

Referring to FIG. 9, it is desirable to predetermine for each adhesive used and for each material or combination of materials of the first member 12 and the second member 14 an optimum bond-line or adhesive layer thickness 22 to maximize joint strength. This data is derived on a case-by-case basis, and an example is provided in a graph 52. Graph 52 provides on an ordinate 54 a range of measured joint strengths, of a bonded 2.5 mm thick lap-shear carbon fiber composite, defining a force to break a lap-shear joint made with 38 mm×125 mm having an overlap of 38 mm×38 mm, identified in pounds, and on an abscissa 56 multiple bonding or adhesive layer thicknesses, provided in increments of 0.25 mm. In the example provided in graph 52, a maximum or optimum joint strength of approximately 2950 lb. occurs using an adhesive layer thickness of 0.5 mm for a sandwich of the first member 12, the adhesive layer 16, and the second member 14 made of a 30% mass carbon fiber. Using graph 52, the user can therefore select the optimum adhesive layer thickness of 0.5 mm for subsequent installations having these materials. Multiple similar graphs can be created to use when selecting different material combinations for different aspects of the spin fastening system 10. Multiple different ones of the optimum adhesive layer thickness 22 for different materials and different adhesives can therefore be saved for example in a memory of a computer system.

A spin fastening system 10 and method of assembly of the present disclosure offers several advantages. These include the use of a cured adhesive positioned between members such as body panels or structural members of a vehicle. At least one spin fastener is inserted through the first and the second members as well as the cured adhesive layer. The cured adhesive layer acts similar to the materials of the first and the second members to liquefy during installation of the spin fastener. The cured adhesive layer prevents accumulation of liquefied material created during installation of the spin fastener from accumulating between the first member and the second member which could weaken a connection between the first member and the second member. Further methods of preventing accumulation of liquefied material can include presetting the part locations, for example by resistance welding, clinching, and the like, prior to fastening. The system and methods of the present disclosure can be used at least for material combinations of the first member 12 and the second member 14 including metal-metal, metal-polymeric composite, and polymeric composite to polymeric composite.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for spin fastening components, comprising:
applying an adhesive layer to a first member;
positioning a second member in contact with the adhesive layer;
curing at least a portion of the adhesive layer after the second member is positioned in contact with the adhesive layer to render at least the portion of the adhesive layer substantially rigid, wherein the cured portion of the adhesive layer is less than an entirety of the adhesive layer; and
inserting at least one spin fastener successively through each of the second member, the cured portion of the adhesive layer, and the first member to mechanically join the first member, the adhesive layer and the second member.

2. The method for spin fastening components of claim 1, further including rotating the at least one spin fastener such that when a penetration end of the spin fastener at least one is brought into direct contact with an outward facing surface of the second member, heat and pressure generated by the penetration end at the outward facing surface causes a portion of a material of the second member to liquefy.

3. The method for spin fastening components of claim 1, further including:
forcing a first outward flow portion of a liquefied material of the adhesive layer and of the first member to congregate between an outward facing surface of the second member and a head of the at least one spin fastener; and
pushing a second outward flow portion of a liquefied material of the cured portion of the adhesive layer and of the first member outward from the first member to pool in contact with an outward facing surface of the first member, the cured adhesive preventing any of the first outward flow portion or the second outward flow portion from remaining proximate to the adhesive layer.

4. The method for spin fastening components of claim 1, further including embedding a plurality of spheres into the adhesive layer, each of the spheres having a common diameter substantially equal to a desired thickness of the adhesive layer.

5. A method for spin fastening components, comprising:
applying an adhesive layer to a first member;
positioning a second member in contact with the adhesive layer;
curing a portion of the adhesive layer after the second member is positioned in contact with the adhesive layer to render the cured portion of the adhesive layer substantially rigid, wherein the cured portion of the adhesive layer is less than an entirety of the adhesive layer; and
inserting at least one spin fastener successively through each of the second member, the cured portion of the adhesive layer, and the first member to mechanically join the first member, the adhesive layer and the second member, the at least one spin fastener forcing a liquefied first portion of the second member to accumulate proximate to a head of the at least one spin fastener and forcing a liquefied second portion containing material of the adhesive layer and the first member to accumulate proximate to an exposed portion of a shank of the at least one spin fastener, the cured portion of the adhesive layer preventing any of the liquefied first portion or the liquefied second portion from remaining proximate to the adhesive layer.

6. The method of claim 5 wherein the at least one spin fastener liquefies the liquefied first portion of the second member when the spin fastener at least one is inserted.

7. The method of claim 5 further comprising embedding a plurality of spheres into the adhesive layer.

8. The method of claim 7, wherein each of the spheres has a common diameter substantially equal to a desired value of a thickness of the adhesive layer.

9. The method of claim 8, wherein each of the spheres is a polymeric material.

10. The method of claim 8, wherein when the second member is positioned in contact with the adhesive layer the spheres directly contact a surface of the first member and an oppositely directed surface of the second member.

11. The method of claim 8, wherein the spheres are substantially incompressible by a force exerted on the adhesive layer during insertion of the at least one spin fastener such that contact of the second member with the adhesive layer does not compress the adhesive layer below a desired thickness of the adhesive layer.

12. The method of claim 8, wherein when a material of the spheres cannot be liquefied by a temperature generated during insertion of the at least one spin fastener, the spheres are selectively embedded into the adhesive layer outside of a predefined width of the cured portion of the adhesive layer to avoid contact by the at least one spin fastener with the spheres.

13. The method of claim 5, wherein the adhesive layer is applied in a substantially viscous liquid form to a surface of the first member prior to positioning of the second member.

14. The method of claim 5, wherein a width and a position of the cured portion of the adhesive layer are predetermined to suit a desired installation location of one of the at least one spin fastener.

15. The method of claim 5, wherein a thickness of the adhesive layer after curing and prior to installation of the at least one spin fastener is substantially fixed and is not substantially compressible during insertion of the at least one spin fastener.

* * * * *